Patented Oct. 8, 1935

2,016,392

UNITED STATES PATENT OFFICE 2,016,392

ESTER OF NAPHTHENIC ACID

George Schneider, Montclair, N. J., assignor to Celanese Corporation of America, a corporation of Delaware No Drawing. Application January 23, 1933, Serial No. 653,193

6 Claims. (Cl. 260—99.40)

This invention relates to new esters of naphthenic acids and to the preparation of compositions containing derivatives of cellulose containing such esters of naphthenic acid as plasticizers or softening agents.

An object of my invention is to prepare new esters of naphthenic acids. A further object of my invention is to prepare compositions, such as plastic or liquid coating compositions, containing derivatives of cellulose wherein an ester of a naphthenic acid is employed as a plasticizer. Other objects of my invention will appear from the following detailed description.

I have found that esters of naphthenic acids are capable of forming solutions with derivatives of cellulose and are excellent plasticizers, softening agents, or camphor substitutes for use in conjunction with derivatives of cellulose to impart softness, pliability and other desirable properties to plastics, films, textiles, and other materials containing derivatives of cellulose.

In accordance with my invention, I prepare new esters of naphthenic acids by any suitable method and further in accordance with my invention I prepare compositions containing derivatives of cellulose and an ester of naphthenic acid as plastifier or softening agent.

The esters embraced within this invention may be represented by the structural formula:

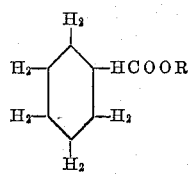

wherein one or more of the hydrogen atoms may be replaced by any suitable substituent, such as ethyl, methyl, propyl or other alkyl group, phenyl or other aryl group, a halogen such as chlorine, bromine, iodine, etc.; and where R represents methyl, ethyl, propyl, butyl or other alkyl group, phenyl or other aryl group, benzyl or other aralkyl group, and particularly the radicles corresponding to the partial ethers of polyhydric alcohols. Examples of the partial ethers of polyhydric alcohols are the mono-methyl, ethyl or phenyl ether of ethylene glycol.

Any suitable method may be used in the preparation of these esters of naphthenic acids. Thus the naphthenic acid may be caused to react by heating with the alcohol corresponding to the ester desired, such as methyl alcohol, ethyl alcohol, or the mono-methyl ether of ethylene glycol, $CH_3.OCH_2.CH_2OH$, or other partial ether of a polyhydric alcohol, in the presence of a catalyst or condensing agent such as sulfuric acid. Alternatively, the anhydrides or the chlorides of the naphthenic acids may be caused to react with the desired alcohol or the desired partial ether of a polyhydric alcohol.

Any suitable derivative of cellulose may be employed in conjunction with the esters of naphthenic acids, such as cellulose nitrate but I prefer to employ organic derivatives of cellulose, such as organic esters of cellulose or cellulose ethers. Examples of organic esters of cellulose are cellulose acetate, cellulose formate, cellulose propionate and cellulose butyrate, while examples of cellulose ethers are ethyl cellulose, methyl cellulose and benzyl cellulose.

Plastic compositions containing the derivative of cellulose and the esters of naphthenic acids may be made in any suitable manner and they may be worked up into sheets, rods, tubes, blocks or any other desired shape. Molding powder containing the derivative of cellulose and the ester of naphthenic acid in intimate association but containing little or no solvent may be made, and these powders may be molded under heat and pressure to any desired shape. Filaments, yarns and other textile materials may be made from solutions containing the organic derivatives of cellulose and the ester of naphthenic acid by extrusion through orifices into an evaporative atmosphere, as in dry spinning, or into a precipitating bath as in wet spinning.

Solutions of the organic derivative of cellulose and the ester of naphthenic acid in a volatile solvent may be cast or extruded onto a smooth surface and the volatile solvent permitted to evaporate to form films that may be used for photographic or other purposes. Another application of this invention is in the preparation of laminated glass wherein a plastic sheet containing the derivative of cellulose and the ester of naphthenic acid is interposed between sheets of glass. Coating compositions such as lacquers may be formed containing the derivative of cellulose and the ester of naphthenic acid dissolved in appropriate solvent mixtures, and resins, either synthetic or natural, compatible with the derivative of cellulose may be added thereto.

The proportion of the ester of naphthenic acid to the derivative of cellulose may be varied in accordance with the particular requirements. Generally I have found that in the case of its use with cellulose acetate, the ester of naphthenic acid may be employed in amounts of 10% or less to 60% or more of the weight of the cellulose acetate.

In making the compositions in accordance with my invention, the ester of naphthenic acid may be employed as the sole plastifying agent, or it may be used in conjunction with other plastifiers such as triacetin, dibenzyl tartrate, diethyl tartrate, dibutyl tartrate, diethyl phthalate, the phthalate of the mono methyl ether of ethylene glycol, etc.

In making these compositions, solvents of appropriate nature, such as acetone, methyl acetate, ethylene formal, ethyl lactate, formal glycerol, diacetone alcohol, of varying boiling points may be used to suit the particular requirements. Effect materials such as pigments, filling materials or dyes may be added to produce any desired effect.

The term "a naphthenic acid" as used in the claims is intended to cover not only naphthenic acid $C_6H_{11}COOH$ itself, but also its homologues or substitution derivatives.

It is to be understood that the foregoing detailed description is given merely by way of illustration, and that many variations may be made therein without departing from the spirit of my invention.

Having described my invention, what I claim and desire to secure by Letters Patent is:

1. The naphthenic acid ester of a partial ether of a polyhydric alcohol.
2. The naphthenic acid ester of a partial alkyl ether of a polyhydric alcohol.
3. The naphthenic acid ester of the monomethyl ether or ethylene glycol.
4. The naphthenic acid ester of the mono-ethyl ether of ethylene glycol.
5. The naphthenic monocarboxylic acid ester of a partial ether of a polyhydric alcohol.
6. The naphthenic monocarboxylic acid ester of a partial alkyl ether of a polyhydric alcohol.

GEORGE SCHNEIDER.

CERTIFICATE OF CORRECTION.

Patent No. 2,016,392.                                                             October 8, 1935.

GEORGE SCHNEIDER.

It is hereby certified that error appears in the heading to the printed specification of the above numbered patent requiring correction as follows: Line 2, for "ESTER OF NAPHTHENIC ACID" read ESTERS OF NAPHTHENIC ACID; and page 2, second column, line 13, claim 3, for "or" read of; and that the said Letters Patent should be read with these corrections therein that the same may conform to the record of the case in the Patent Office.

Signed and sealed this 12th day of November, A. D. 1935.

(Seal)                                                       Leslie Frazer
                                                            Acting Commissioner of Patents.